United States Patent
Haruna et al.

(10) Patent No.: US 9,910,216 B2
(45) Date of Patent: Mar. 6, 2018

(54) OPTICAL FIBER

(71) Applicant: SUMITOMO ELECTRIC INDUSTRIES, LTD., Osaka-shi, Osaka (JP)

(72) Inventors: Tetsuya Haruna, Yokohama (JP); Yoshiaki Tamura, Yokohama (JP); Yoshihiro Tukuda, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/645,303

(22) Filed: Jul. 10, 2017

(65) Prior Publication Data

US 2017/0305781 A1    Oct. 26, 2017

Related U.S. Application Data

(63) Continuation of application No. PCT/JP2016/050855, filed on Jan. 13, 2016.

(30) Foreign Application Priority Data

Jan. 14, 2015    (JP) .................... 2015-004887

(51) Int. Cl.
*G02B 6/036*    (2006.01)
*C03C 3/06*    (2006.01)
(Continued)

(52) U.S. Cl.
CPC ........ *G02B 6/03694* (2013.01); *C03B 37/018* (2013.01); *C03B 37/01446* (2013.01);
(Continued)

(58) Field of Classification Search
None
See application file for complete search history.

(56) References Cited

U.S. PATENT DOCUMENTS 4,242,117 A * 12/1980 van Ass ............ C03C 13/046
                                                    385/124
5,146,534 A    9/1992 Lines
(Continued)

FOREIGN PATENT DOCUMENTS

EP    2 910 533    8/2015
JP    H05-043267 A    2/1993
(Continued)

OTHER PUBLICATIONS

A.E. Geissberger et al., "Raman studies of vitreous $SiO_2$ versus fictive temperature", Physical Review B, 1983, vol. 28, No. 6, p. 3266-p. 3271.

*Primary Examiner* — Mike Stahl
(74) *Attorney, Agent, or Firm* — Drinker Biddle & Reath LLP (57) ABSTRACT

One of embodiments relates to an optical fiber in which an alkali metal element is efficiently doped to its core to suppress transmission loss from increasing. A mean concentration or a concentration distribution of the alkali metal element is adjusted such that 0.48 or less is obtained as an weighted value obtained by weighting a distribution of field intensity of guided light at a wavelength of 1550 nm, with respect to a radial direction distribution of a ratio $I_{D2}/I_{\omega 3}$ of an intensity $I_{D2}$ of Raman scattering light by a silica three-membered ring structure and an intensity $I_{\omega 3}$ of Raman scattering light by a Si—O stretching vibration, in a cross-sectional region having a diameter of 20 μm.

15 Claims, 9 Drawing Sheets

(51) Int. Cl.
*C03B 37/014* (2006.01)
*C03B 37/018* (2006.01)
*C03C 25/68* (2006.01)

(52) U.S. Cl.
CPC .. *C03B 37/01466* (2013.01); *C03B 37/01473* (2013.01); *C03C 3/06* (2013.01); *C03C 25/68* (2013.01); *C03B 2203/22* (2013.01); *C03C 2201/50* (2013.01)

(56) References Cited

U.S. PATENT DOCUMENTS

| | | | |
|---|---|---|---|
| 5,410,428 A * | 4/1995 | Yamagata | C03B 19/1453 |
| | | | 252/588 |
| 7,469,559 B2 | 12/2008 | Ball et al. | |
| 2005/0063663 A1* | 3/2005 | Anderson | C03B 37/01211 |
| | | | 385/142 |
| 2006/0130530 A1 | 6/2006 | Anderson et al. | |
| 2012/0189262 A1* | 7/2012 | Hirano | C03B 37/01807 |
| | | | 385/142 |
| 2016/0318793 A1* | 11/2016 | Tamura | C03C 13/046 |
| 2017/0022094 A1* | 1/2017 | Yan | C03B 37/01208 |
| 2017/0101334 A1* | 4/2017 | Haruna | C03B 37/01211 |

FOREIGN PATENT DOCUMENTS

| | | |
|---|---|---|
| JP | H06-048775 A | 2/1994 |
| JP | 2005-537210 A | 12/2005 |
| WO | WO-2004/020357 A2 | 3/2004 |
| WO | WO 2005/058765 | 6/2005 |
| WO | WO 2014/178361 | 11/2014 |

\* cited by examiner

| SAMPLE | MEAN K-CONCENTRATION IN CORE PORTION [ATOM ppm] | TRANSMISSION LOSS AT 1550nm [dB/km] | $(I_{D2}/I_{\omega 3})_{weight}$ | $(I_{D2}/I_{\omega 3})_{Pmax}$ | $(I_{D2}/I_{\omega 3})_{difference}$ |
|---|---|---|---|---|---|
| 1 | 10 | 0.157 | 0.53 | 0.56 | 0.12 |
| 2 | 10 | 0.157 | 0.50 | 0.54 | 0.10 |
| 3 | 10 | 0.156 | 0.47 | 0.51 | 0.08 |
| 4 | 10 | 0.155 | 0.47 | 0.49 | 0.06 |
| 5 | 15 | 0.154 | 0.45 | 0.48 | 0.14 |
| 6 | 15 | 0.153 | 0.44 | 0.47 | 0.12 |
| 7 | 15 | 0.152 | 0.42 | 0.45 | 0.08 |
| 8 | 15 | 0.151 | 0.40 | 0.43 | 0.06 |
| 9 | 20 | 0.151 | 0.38 | 0.42 | 0.13 |
| 10 | 20 | 0.149 | 0.35 | 0.39 | 0.10 |
| 11 | 20 | 0.148 | 0.34 | 0.36 | 0.07 |

OPTICAL FIBER

CROSS-REFERENCE TO RELATED APPLICATIONS

This application is a continuation application of PCT/JP2016/050855 claiming the benefit of priority of the Japanese Patent Application No. 2015-004887 filed on Jan. 14, 2015, the entire contents of which are incorporated herein by reference.

TECHNICAL FIELD

The present invention relates to an optical fiber.

BACKGROUND ART

As an optical fiber in which Rayleigh scattering is small and transmission loss is small, an optical fiber of silica-based glass in which an alkali metal element is doped to its core is known. If a core portion (core preform) of an optical fiber preform includes the alkali metal element, viscosity of the core portion can be decreased when the optical fiber preform is drawn. In this case, since a network structure of the silica glass is relaxed, a fictive temperature in the optical fiber decreases. As a result, the alkali metal element is doped to the core, so that reduction of the transmission loss in the optical fiber is theoretically enabled.

As a method of doping the alkali metal element to the silica glass, a diffusion method is known (for example, refer to PTLs 1 and 2). In the diffusion method, for diffusing and doping the alkali metal element diffuses into an inner surface of a glass pipe, raw material vapor of the alkali metal element or alkali metal salt to be a raw material is introduced into the glass pipe while the glass pipe is heated by an external heat source or plasma is generated in the glass pipe.

After the alkali metal element is doped to the vicinity of the inner surface of the glass pipe as described above, a diameter of the glass pipe is reduced by heating. After the diameter is reduced, the inner surface of the glass pipe is etched by a certain thickness for the purpose of removing a transition metal element such as Ni and Fe doped simultaneously in the doping of the alkali metal element. Diffusion of the alkali metal element is faster than diffusion of the transition metal element. For this reason, even though the glass surface is etched by the certain thickness (the transition metal element is removed), the alkali metal element can be caused to remain in the glass pipe. After the etching, the glass pipe is solidified by the heating, so that an alkali metal element doped core rod is manufactured. A cladding portion having a refractive index lower than that of the core portion including the alkali metal element doped core rod is synthesized to the outside of the alkali metal element doped core rod, so that an optical fiber preform is manufactured. Furthermore, the optical fiber preform is drawn, so that an optical fiber is manufactured.

CITATION LIST

Patent Literature

Patent Document 1: Japanese Translation of PCT International Application Publication No. JP-T-2005-537210
Patent Document 2: US Patent Application Laid-Open No. US2006/0130530A1

Non Patent Literature

Non-Patent Document 1: Raman studies of vitreous SiO2 versus fictive temperature, Physical Review B., 28, 3266 (1983).

SUMMARY OF INVENTION

Technical Problem

The inventors have examined the optical fiber according to the related art and have found the following problems as a result thereof. That is, the alkali metal element diffuses and is doped into the inner surface of the glass pipe, using the diffusion method. As a result, a fictive temperature distribution (fictive temperature distribution of a radial direction) in the core has a tendency to be minimized in an optical axis (matched with a center of a cross section of the optical fiber), due to the diffusion of the alkali metal element into the glass. In this case, if a power distribution of light guided in the core is considered, a fictive temperature of an outer circumferential portion of the core in which power is large increases. For this reason, the transmission loss of the optical fiber is not sufficiently reduced. Meanwhile, if the alkali metal element of the high concentration is doped at one time to decrease the transmission loss of the optical fiber, crystallization of the alkali metal element occurs and the transmission loss increases.

The present invention has been made to resolve the problems described above and an object thereof is to provide an optical fiber in which an alkali metal element is efficiently doped to its core to effectively suppress transmission loss from increasing due to doping of the alkali metal element to the core.

Solution to Problem

An optical fiber according to the present embodiment is comprised of silica-based glass as a main component, and the optical fiber includes: a core configured to extend along an optical axis and include an alkali metal element; and a cladding configured to surround the core and have a refractive index lower than that of the core. In particular, an alkali metal is efficiently doped to a core, such that a radial direction distribution of a ratio $I_{D2}/I_{\omega3}$ of an intensity $I_{D2}$ of Raman scattering light D2 by a silica three-membered ring structure and an intensity $I_{\omega3}$ of Raman scattering light $\omega3$ by a Si—O stretching vibration in a Raman scattering spectrum satisfies predetermined requirements. As a result, transmission loss can be effectively suppressed from increasing due to doping of the alkali metal element to the core.

Advantageous Effects of Invention

According to the present embodiment, an optical fiber in which an alkali metal element is efficiently doped to its core to effectively suppress transmission loss from increasing due to doping of an alkali metal is obtained.

DESCRIPTION OF EMBODIMENTS

[Description of Embodiment of Present Invention]

First, contents of an embodiment of the present invention are individually enumerated and are described.

(1) An optical fiber according to the present embodiment is an optical fiber comprised of silica-based glass as a main component, and the optical finer includes: a core configured to extend along an optical axis and include an alkali metal element; and a cladding configured to surround the core and have a refractive index lower than that of the core.

(2) As one aspect of the present embodiment, where an intensity of Raman scattering light ω3 by a Si—O stretching vibration in a Raman scattering spectrum is $I_{\omega 3}$ and an intensity of Raman scattering light D2 by a silica three-membered ring structure is $I_{D2}$, a mean concentration of the alkali metal element in the core or a shape of a concentration distribution of the alkali metal element in the core is preferably adjusted such that 0.48 or less is obtained as an weighted value $(I_{D2}/I_{\omega 3})_{weight}$ of a distribution of a ratio $I_{D2}/I_{\omega 3}$ along the radial direction of the optical fiber, the weighted value being obtained by weighting a distribution of field intensity along a radial direction of guided light at a wavelength of 1550 nm, calculated on the basis of a refractive index profile along the radial direction of the optical fiber, in a region including the optical axis as a center and having a diameter of 20 μm in a cross section of the optical fiber orthogonal to the optical axis. In addition, both the mean concentration of the alkali metal element in the core and the shape of the concentration distribution of the alkali metal element in the core may be adjusted.

Specifically, the weighted value $(I_{D2}/I_{107\ 3})_{weight}$ is given by the following Expression (1) defining weighting in the region having the optical axis AX as the center and having the diameter of 20 μm. That is, where a distance from the optical axis AX is r in the cross section of the optical fiber, $I_{D2}/I_{\omega 3}$ of a numerator of Expression (1) shows the distribution (ratio $I_{D2}(r)/I_{\omega 3}(r)$ at the position of the distance r from the optical axis AX) of the ratio $I_{D2}/I_{\omega 3}$ along the radial direction of the optical fiber and E(r) shows the radial direction distribution of field intensity (field intensity at the position of the distance r from the optical axis AX) of the guided light at the wavelength of 1550 nm calculated on the basis of the refractive index profile along the radial direction. Therefore, the weighted value $(I_{D2}/I_{\omega 3})_{weight}$ given by the following Expression (1) becomes a value standardized by a value of the following Expression (2).

$$\frac{\int_0^{2\pi}\int_0^{10}\left(|E(r)|^2 \cdot \frac{I_{D2}}{I_{\omega 3}}\right)r\,dr\,d\varphi}{\int_0^{2\pi}\int_0^{10}|E(r)|^2\,r\,dr\,d\varphi} \quad (1)$$

$$\int_0^{2\pi}\int_0^{10}|E(r)|^2\,r\,dr\,d\varphi \quad (2)$$

(3) As one aspect of the present embodiment, where an intensity of Raman scattering light ω3 by a Si—O stretching vibration in a Raman scattering spectrum is $I_{\omega 3}$ and an intensity of Raman scattering light D2 by a silica three-membered ring structure is $I_{D2}$, a mean concentration of the alkali metal element in the core or a shape of a concentration distribution of the alkali metal element in the core may be adjusted such that 0.50 or less is obtained as a value $(I_{D2}/I_{\omega 3})_{Pmax}$ of a ratio $I_{D2}/I_{\omega 3}$ at a position where a field intensity of guided light at a wavelength of 1550 nm calculated on the basis of a refractive index profile of the optical fiber is maximized, in a cross section of the optical fiber orthogonal to the optical axis. In addition, both the mean concentration of the alkali metal element in the core and the shape of the concentration distribution of the alkali metal element in the core may be adjusted.

(4) As one aspect of the present embodiment, where an intensity of Raman scattering light ω3 by a Si—O stretching vibration in a Raman scattering spectrum is $I_{\omega 3}$ and an intensity of Raman scattering light D2 by a silica three-membered ring structure is $I_{D2}$, a mean concentration of the alkali metal element in the core or a shape of a concentration distribution of the alkali metal element in the core may be adjusted such that 0.15 or less is obtained as a difference $(I_{D2}/I_{\omega 3})_{difference}$ between a value of a ratio $I_{D2}/I_{\omega 3}$ at a position where a field intensity of guided light at a wavelength of 1550 nm calculated on the basis of a refractive index profile of the optical fiber is maximized and a value of a ratio $I_{D2}/I_{\omega 3}$ on the optical axis, in a cross section of the optical fiber orthogonal to the optical axis. In addition, both the mean concentration of the alkali metal element in the core and the shape of the concentration distribution of the alkali metal element in the core may be adjusted.

(5) As one aspect of the present embodiment, the alkali metal element preferably includes potassium.

(6) As one aspect of the present embodiment, the concentration distribution of the alkali metal element, in the cross section of the optical fiber orthogonal to the optical axis, preferably has a shape in which a first concentration peak is located in an annular region surrounding the optical axis in a state in which the annular region is separated by a predetermined distance from the optical axis. In this case, the concentration distribution of the alkali metal element in the cross section of the optical fiber orthogonal to the optical axis may have a shape in which a second concentration peak of a maximum concentration lower than a maximum concentration of the first concentration peak is located in a region surrounded by the annular region.

(7) As one aspect of the present embodiment, the concentration distribution of the alkali metal element, in the cross section of the optical fiber orthogonal to the optical axis, may have a shape in which there are a plurality of concentration peaks separated from each other along the radial direction of the optical fiber. In this case, a maximum concentration of one concentration peak close to the optical axis in two adjacent concentration peaks included in the plurality of concentration peaks is preferably lower than a maximum concentration of the other concentration peak in the two adjacent concentration peaks.

Each aspect enumerated in a section of [Description of embodiment of present invention] is applicable to each of the remaining aspects or all combinations of the remaining aspects.

[Details of Embodiment of Present Invention]

Hereinafter, a specific structure of an optical fiber according to the present embodiment will be described in detail with reference to the accompanying drawings. However, it is intended that the present invention is not limited to the exemplary embodiment and all changes within the scope of the appended claims and their equivalents are included in the present invention. In description of the drawings, the same elements are denoted with the same reference numerals and overlapped explanation is omitted.

First, a relation of a Raman scattering spectrum and a fictive temperature of silica-based glass will be described. Generally, if light is radiated to a substance, Raman scattering light having a wavelength different from a wavelength of the radiation light is generated by the interaction of the light and the substance (molecular vibration). A structure of the substance can be analyzed at a level of a molecule, using a Raman scattering spectrum obtained by spectrally dispersing the Raman scattering light. If laser light having a wavelength of 532 nm is radiated to the silica-based glass, a Raman scattering spectrum illustrated in FIG. 1 is obtained.

Figure 1:
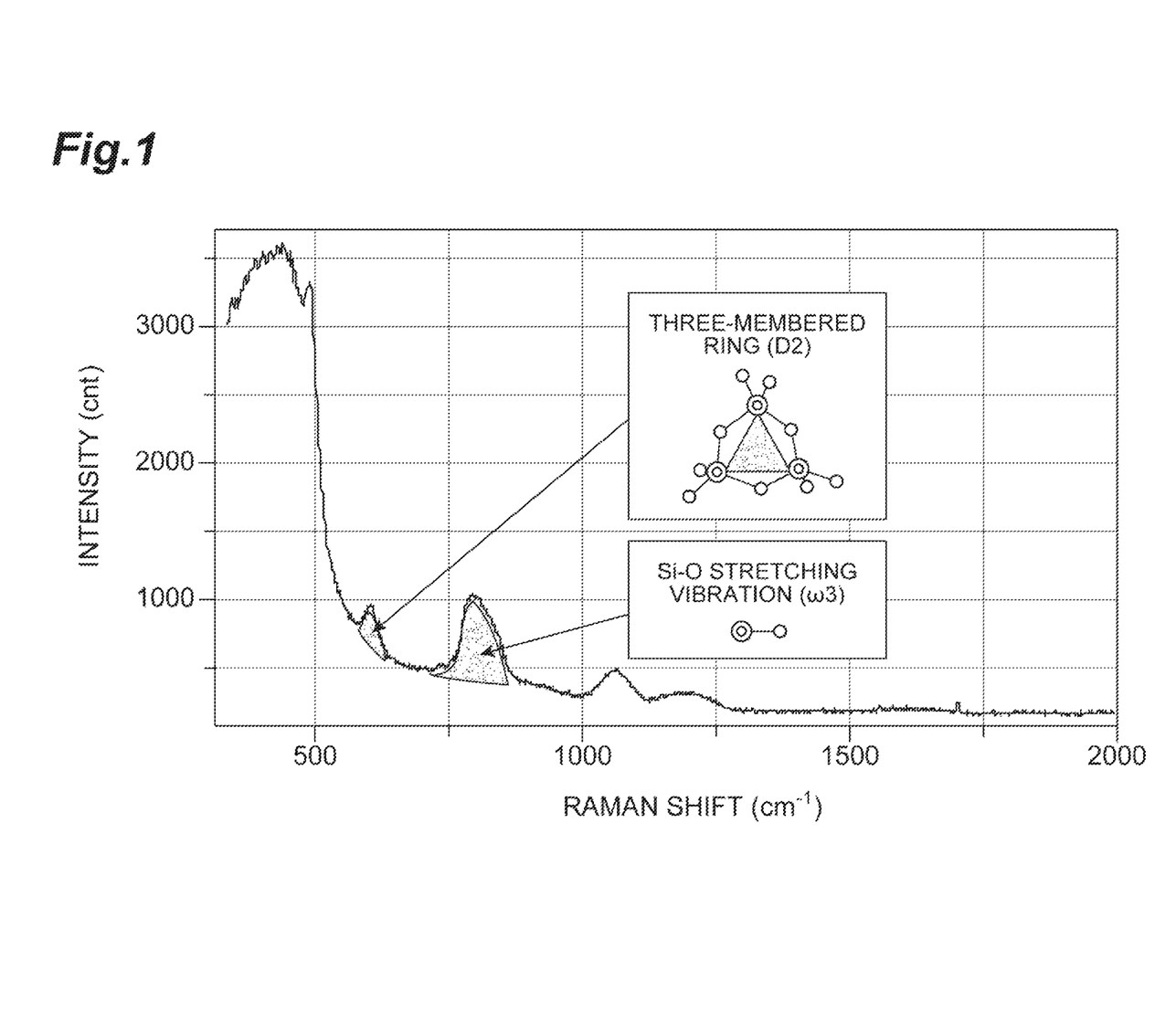
FIG. 1 is a diagram illustrating an example of a Raman scattering spectrum of silica-based glass.

In FIG. 1, Raman scattering light ω3 by a Si—O stretching vibration is recognized in a wave number range of 750 to 875 cm$^{-1}$. In addition, Raman scattering light D2 belonging to a silica three-membered ring structure is recognized in a wave number range of 565 to 640 cm$^{-1}$. Raman scattering light D1 belonging to a silica four-membered ring structure is recognized in a wave number range of 475 to 525 cm$^{-1}$.

In the following description, an intensity $I_{\omega 3}$ of the Raman scattering light ω3 by the Si—O stretching vibration is represented by a mean intensity of a region sandwiched between a baseline drawn in the wave number range of 750 to 875 cm$^{-1}$ in the Raman scattering spectrum and the Raman scattering spectrum. An intensity $I_{D2}$ of the Raman scattering light D2 by the silica three-membered ring structure is represented by a mean intensity of a region sandwiched between a baseline drawn in the wave number range of 565 to 640 cm$^{-1}$ in the Raman scattering spectrum and the Raman scattering spectrum.

It is known that, when a ratio $I_{D2}/I_{\omega 3}$ is small, uniformity of the silica-based glass advances and a fictive temperature is low (refer to Non-Patent Document 1). In an optical fiber using the silica-based glass as a main component, theoretically, when the ratio $I_{D2}/I_{\omega 3}$ is small, Rayleigh scattering loss decreases and transmission loss decreases.

Measurement of the ratio $I_{D2}/I_{\omega 3}$ in the optical fiber is performed by a microscopic Raman spectroscopic method to be described below, for example. After laser light output from a semiconductor laser device and having a wavelength of 532 nm is caused to pass through a slit having a width of 100 μm, the laser light is condensed by an objective lens having a magnification of 50 times. As a result, the laser light having a spot diameter of about 2 μm is radiated to an optical fiber end face. Exposure is performed twice at integrated time of 30 seconds. The intensity of the laser light is an oscillation output of 1 W (about 100 mW in the optical fiber end face). In a state in which the laser light is vertically radiated to the optical fiber end face, backscattering light is received by a detector and the Raman scattering spectrum is measured. In addition, scanning is performed in a fiber radial direction while the laser light is radiated, so that a Raman scattering light distribution of the fiber radial direction is measured.

To correct a difference of sensitivities between individual channels of the detector when the Raman scattering spectrum is measured, the following calculation is performed.

[Spectrum after correction]=[measured spectrum]× [individual channel correction coefficient]

[Individual channel correction coefficient]=[measured spectrum of halogen lamp for calibration]÷ [theoretical spectrum of halogen lamp for calibration]

After calculation of the intensity $I_{\omega 3}$ of the Raman scattering light ω3 by the Si—O stretching vibration and calculation of the intensity $I_{D2}$ of the Raman scattering light D2 belonging to the silica three-membered ring structure, based on data of wave number dependency of the Raman scattering spectrum after correction, an intensity ratio $I_{D2}/I_{\omega 3}$ of $I_{D2}$ and $I_{\omega 3}$ is calculated.

Figure 2:
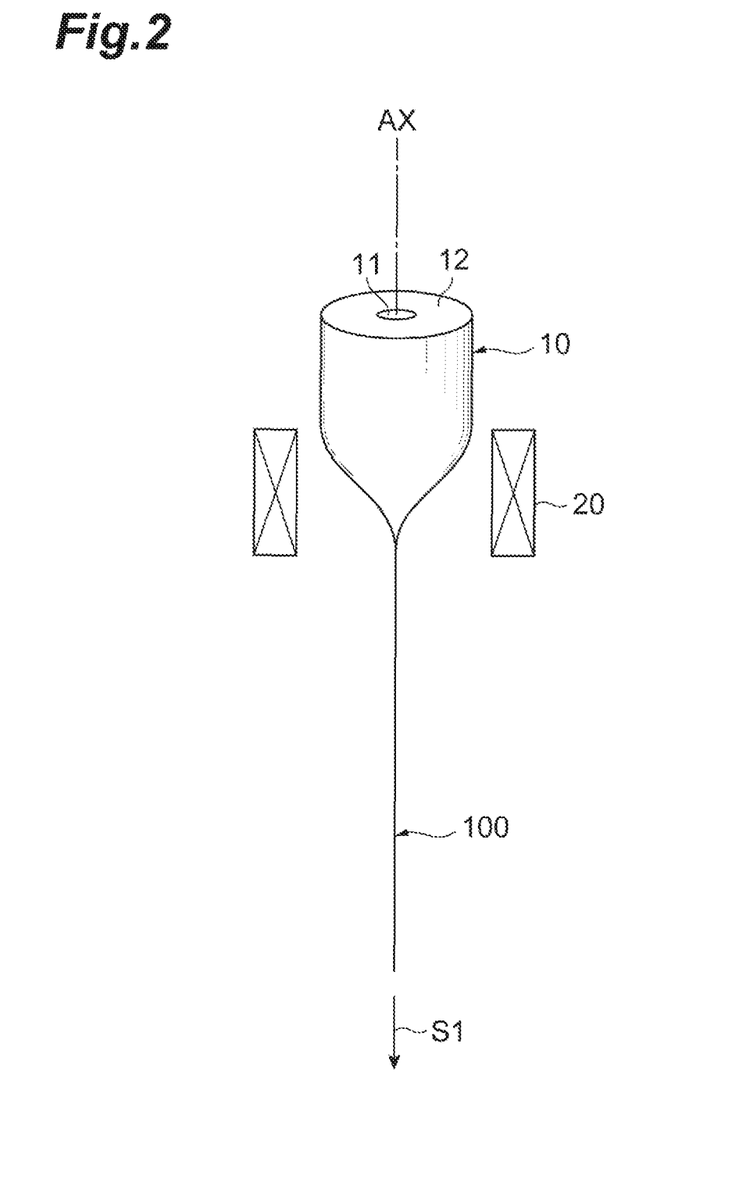
FIG. 2 is a diagram illustrating an example of a drawing step to manufacture an optical fiber according to the present embodiment.
Figure 3A:
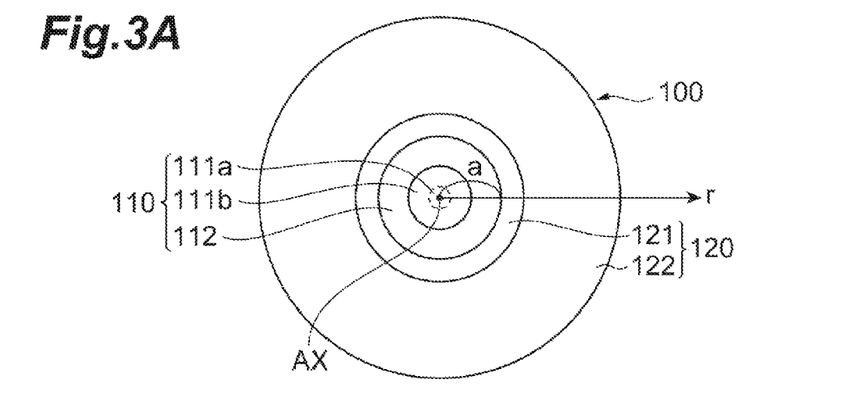
FIGS. 3A to 3C are diagrams respectively illustrating an example of a cross-sectional structure of an optical fiber according to the present embodiment, an example of a refractive index profile, and an example of a potassium concentration distribution.
Figure 3B:
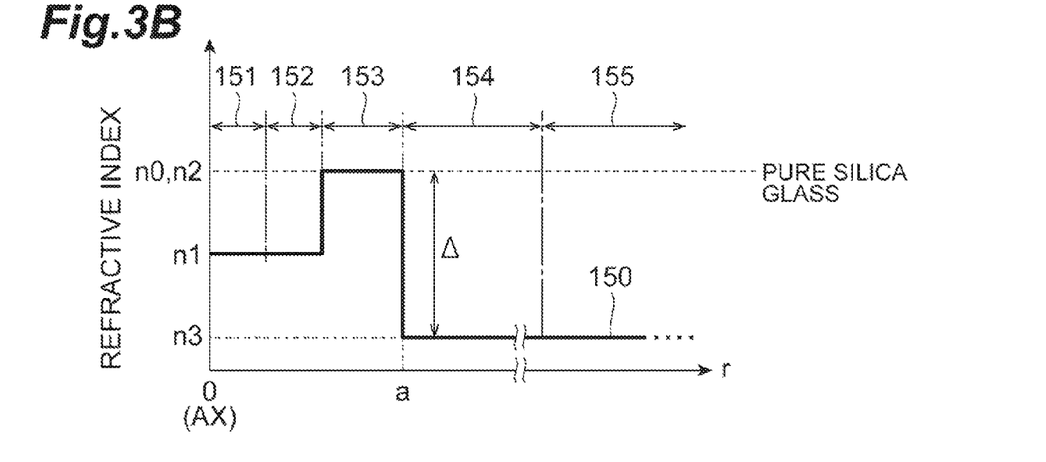
Figure 3C:
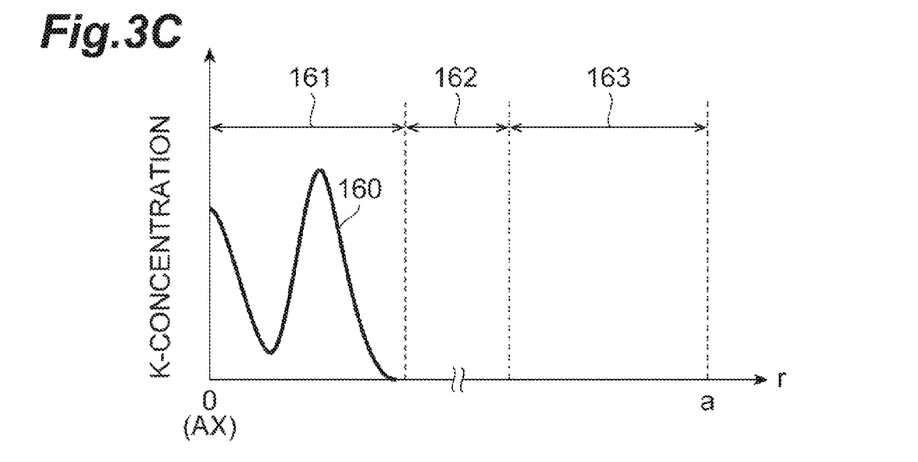

Next, a specific structure of the optical fiber according to the present embodiment will be described with reference to FIGS. 2 and 3A to 3C. FIG. 2 is a diagram illustrating an example of a drawing step to manufacture the optical fiber according to the present embodiment. FIG. 3A is a diagram illustrating an example of a cross-sectional structure of the optical fiber according to the present embodiment, FIG. 3B illustrates an example of a refractive index profile along a radial direction of the optical fiber illustrated in FIG. 3A, and FIG. 3C illustrates an example (K-concentration distribution) of a concentration distribution of an alkali metal along the radial direction of the optical fiber illustrated in FIG. 3A.

Hereinafter, an example of the case in which potassium (K) is doped as an alkali metal element to a core of the optical fiber will be described to simplify description. Therefore, in the following description, an alkali metal doped region is described as a "K-doped region" and an alkali metal undoped region is described as a "K-undoped region". Furthermore, an alkali metal concentration is described as a "K-concentration" and a concentration distribution thereof is described as a "K-concentration distribution".

First, as illustrated in FIG. 2, to obtain the optical fiber according to the present embodiment, an optical fiber preform 10 having a cross-sectional structure similar to the cross-sectional structure of the optical fiber is manufactured. The optical fiber preform 10 includes a core portion 11 (core preform) that extends along an optical axis AX and a cladding portion 12 that is provided on an outer peripheral surface of the core portion 11. One end of the optical fiber preform 10 is heated by a heater 20 and is softened, as illustrated in FIG. 2. A softened portion is drawn in a direction shown by an arrow S1 of FIG. 2, so that an optical fiber 100 is obtained. The core portion 11 is a glass region corresponding to a core 110 (refer to FIG. 3A) of the optical fiber 100 obtained by drawing the optical fiber preform 10 and may be configured using a plurality of glass regions having different refractive indexes. The cladding portion 12 is a glass region corresponding to a cladding 120 (refer to FIG. 3A) of the optical fiber 100 obtained by drawing the optical fiber preform 10 and may be configured using a plurality of glass regions having different refractive indexes.

The optical fiber 100 drawn as illustrated in FIG. 2 has the cross-sectional structure illustrated in FIG. 3A. That is, in the example illustrated in FIG. 3A, the optical fiber 100 includes the core 110 that extends along the optical axis and has a radius a and the cladding 120 that is provided on the outer peripheral surface of the core 110. The core 110 includes an inner core that has a different refractive index and an outer core 112 that is provided on an outer peripheral surface of the inner core. The cladding 120 includes an inner cladding 121 that is provided on an outer peripheral surface of the outer core 112 and an outer cladding 122 that is provided on an outer peripheral surface of the inner cladding 121. The inner core includes a K-doped region 111a where potassium (K) is doped as an alkali metal element and a K-undoped region 111b that is provided on an outer peripheral surface of the K-doped region 111a. In the example illustrated in FIG. 3A, K-concentrations in both the K-undoped region 111b and the outer core 112 are set to 10 atom ppm or less, and the K-undoped region 111b and the outer core 112 configure a core region not including K substantially.

FIG. 3B is a diagram illustrating a refractive index profile 150 along the radial direction of the optical fiber 100. In the refractive index profile 150 of FIG. 3B, a region 151 is a region that corresponds to the K-doped region 111a in the inner core and has a refractive index n1, a region 152 is a region that corresponds to the K-undoped region 111b in the inner core and has a refractive index n1, and a region 153 is a region that corresponds to the outer core 112 and has a refractive index n2 (>n1). A region 154 is a region that corresponds to the inner cladding 121 and has a refractive index n3 (<n1) and a region 155 is a region that corresponds to the outer cladding 122 and has a refractive index n3. However, the refractive index of the region 154 and the refractive index of the region 155 do not need to be matched with each other.

In addition, calculation of a distribution of field intensity and a field intensity becoming a calculation basis of the following $(I_{D2}/I_{\omega 3})_{weight}$ and $(I_{D2}/I_{\omega 3})_{Pmax}$ is performed on the basis of the following structure parameters. That is, a relative refractive index difference of the inner core with respect to pure silica glass (having a refractive index n0) is −0.15%, a relative refractive index difference of the outer core 112 is 0%, a relative refractive index difference of the inner cladding 121 is −0.32%, an outer diameter of the inner core is 4.2 μm, an outer diameter of the outer core 112 is 12.6 μm, and a core radius a is 6.3 μm.

Also, FIG. 3C is a diagram illustrating a K-concentration distribution 160 along the radial direction of the optical fiber 100. In the K-concentration distribution 160 of FIG. 3C, a region 161 is a region (corresponding to the region 151 of FIG. 3B) corresponding to the K-doped region 111a in the inner core, a region 162 is a region (corresponding to the region 152 of FIG. 3B) corresponding to the K-undoped region 111b in the inner core, and a region 163 is a region (corresponding to the region 153 of FIG. 3B) corresponding to the outer core 112. In at least the optical fiber 100 according to the present embodiment, at least one of a mean concentration of K in the core 110 and a shape of the K-concentration distribution along the radial direction is adjusted.

FIGS. 4 to 7 illustrate calculation results based on values of D2 and ω3 measured by a Raman spectroscopic method, with respect to samples 1 to 11 of optical fibers obtained by drawing a plurality of kinds of optical fiber preforms. In each of the plurality of kinds of optical fiber preforms, a mean concentration of K included in a core portion is set to any one of 10, 15, and 20 atom ppm and a region including K in a core portion changes. In each of FIGS. 4 to 7, a symbol "○" shows a calculation result of each of the samples 1 to 4 in which a mean K-concentration in the core 110 is set to 10 atom ppm, a symbol "◇" shows a calculation result of each of the samples 5 to 8 in which a mean K-concentration in the core 110 is set to 15 atom ppm, and a symbol "□" shows a calculation result of each of the samples 9 to 11 in which a mean K-concentration in the core 110 is set to 20 atom ppm. Each of the samples 1, 5, and 9 has a K-concentration distribution in which there is a concentration peak at only a core center including the optical axis AX. Each of the samples 2, 6, and 10 has a K-concentration distribution in which there is only one concentration peak at a position separated from the optical axis AX, between the optical axis AX and the outer core 112. Each of the samples 3, 4, 7, 8, and 11 has a K-concentration distribution in which there are a first concentration peak located at the core center including the optical axis AX and a second concentration peak separated by a predetermined distance from the first concentration peak. In the samples 3 and 4 among the samples 3, 4, 7, 8, and 11 in which there are the two concentration peaks in the K-concentration distribution, mean K-concentrations are matched with each other, but K-doping conditions are different from each other. Likewise, in the samples 7 and 8, mean K-concentrations are matched with each other, but K-doping conditions are different from each other.

Figure 4:
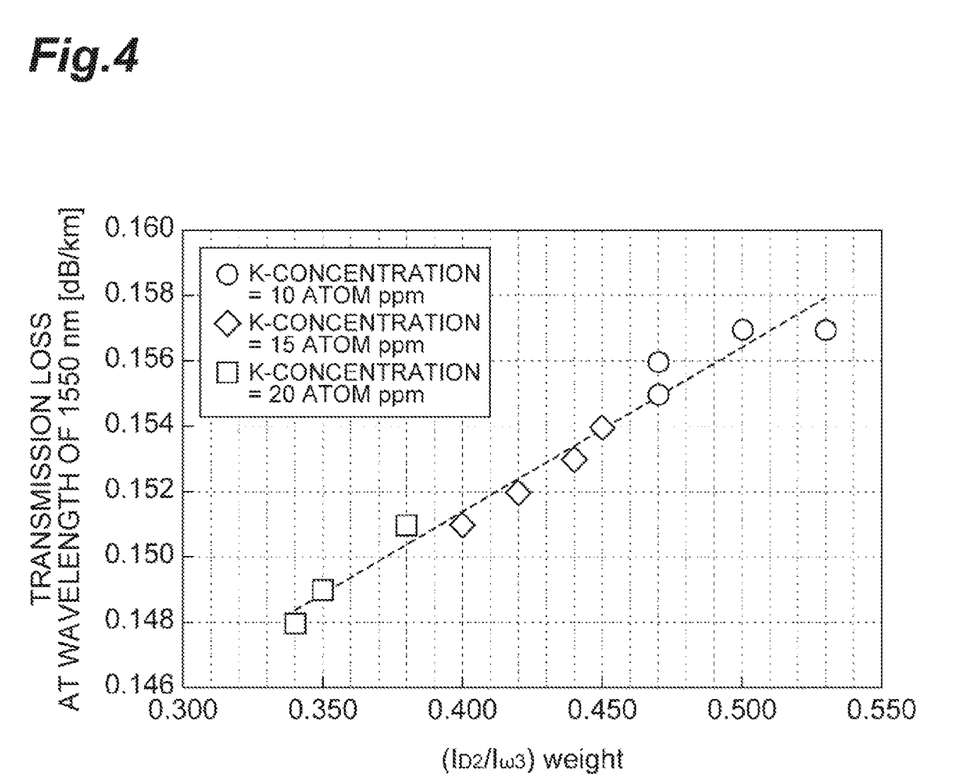
FIG. 4 is a graph illustrating a relation of a $(I_{D2}/I_{\omega 3})_{weight}$ and transmission loss with respect to each of optical fibers of samples 1 to 11.

FIG. 4 is a graph illustrating a relation of a $(I_{D2}/I_{\omega 3})_{weight}$ and transmission loss. $(I_{D2}/I_{\omega 3})_{weight}$ is an weighted value (refer to Expression (1)) obtained by weighting a distribution of field intensity E(r) of guided light at a wavelength of 1550 nm calculated on the basis of the refractive index profile 150 (FIG. 3B) of the optical fiber 100, with respect to a distribution $I_{D2}(r)/I_{\omega 3}(r)$ of a ratio $I_{D2}/I_{\omega 3}$ along the radial direction, in a region having the optical axis AX as a center and having a diameter of 20 μm. The transmission loss is a value at the wavelength of 1550 nm. In FIG. 4, $(I_{D2}/I_{\omega 3})_{weight}$ of the samples 1 to 4 in which the mean K-concentration in the core is set to 10 atom ppm are 0.53, 0.50, 0.47, and 0.47, respectively (refer to FIG. 7). $(I_{D2}/I_{\omega 3})_{weight}$ of the samples 5 to 8 in which the mean K-concentration in the core is set to 15 atom ppm are 0.45, 0.44, 0.42, and 0.40, respectively (refer to FIG. 7). $(I_{D2}/I_{\omega 3})_{weight}$ of the samples 9 to 11 in which the mean K-concentration in the core is set to 20 atom ppm are 0.38, 0.35, and 0.34, respectively (refer to FIG. 7).

From FIG. 4, it is known that the transmission loss at the wavelength of 1550 nm is low when the mean K-concentration of the core is high. It is known that the transmission loss at the wavelength of 1550 nm is low when $(I_{D2}/I_{\omega 3})_{weight}$ is small. It is recognized that there is an approximately linear relation between $(I_{D2}/I_{\omega 3})_{weight}$ and the transmission loss at the wavelength of 1550 nm.

Specifically, the following is known from FIG. 4. To obtain transmission loss≤0.154 dB/km, it is necessary to satisfy $(I_{D2}/I_{\omega 3})_{weight}$≤0.48. To obtain transmission loss≤0.152 dB/km, it is necessary to satisfy $(I_{D2}/I_{\omega 3})_{weight}$≤0.44. To obtain transmission loss≤0.150 dB/km, it is necessary to satisfy $(I_{D2}/I_{\omega 3})_{weight}$≤0.40. Furthermore, to obtain transmission loss≤0.148 dB/km, it is necessary to satisfy $(I_{D2}/I_{\omega 3})_{weight}$≤0.36.

Therefore, to realize transmission loss≤0.154 dB/km, $(I_{D2}/I_{\omega 3})_{weight}$ is preferably 0.48 or less. If a manufacturing variation is considered, $(I_{D2}/I_{\omega 3})_{weight}$ is more preferably 0.44 or less.

Figure 5:
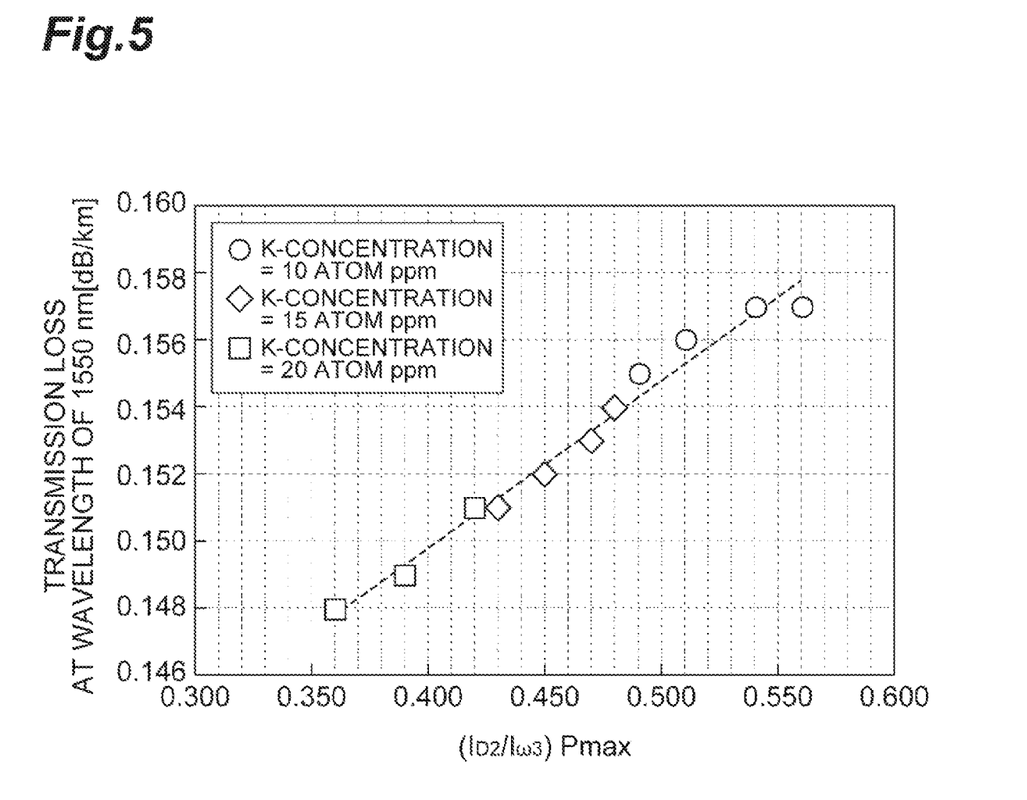
FIG. 5 is a graph illustrating a relation of a $(I_{D2}/I_{\omega 3})_{Pmax}$ and transmission loss with respect to each of optical fibers of samples 1 to 11.

FIG. 5 is a graph illustrating a relation of $(I_{D2}/I_{\omega 3})_{Pmax}$ and transmission loss. $(I_{D2}/I_{\omega 3})_{Pmax}$ is a value of a ratio $I_{D2}/I_{\omega 3}$ at a position where a field intensity of the guided light at the wavelength of 1550 nm calculated on the basis of the refractive index profile 150 (FIG. 3B) of the optical fiber 100 is maximized. The transmission loss is a value at the wavelength of 1550 nm. For example, when an effective cross section of the core is 130 µm² and a mode field diameter is 12.2 µm, a position where a field intensity at the wavelength of 1550 nm is maximized becomes a position of a radius of 4 µm. In FIG. 5, $(I_{D2}/I_{\omega 3})_{Pmax}$ of the samples 1 to 4 in which the mean K-concentration in the core is set to 10 atom ppm are 0.56, 0.54, 0.51, and 0.49, respectively (refer to FIG. 7). $(I_{D2}/I_{\omega 3})_{Pmax}$ of the samples 5 to 8 in which the mean K-concentration in the core is set to 15 atom ppm are 0.48, 0.47, 0.45, and 0.43, respectively (refer to FIG. 7). $(I_{D2}/I_{\omega 3})_{Pmax}$ of the samples 9 to 11 in which the mean K-concentration in the core is set to 20 atom ppm are 0.42, 0.39, and 0.36, respectively (refer to FIG. 7).

From FIG. 5, it is known that the transmission loss at the wavelength of 1550 nm is low when $(I_{D2}/I_{\omega 3})_{Pmax}$ is small. It is recognized that there is an approximately linear relation between $(I_{D2}/I_{\omega 3})_{Pmax}$ and the transmission loss at the wavelength of 1550 nm.

Specifically, the following is known from FIG. 5. To obtain transmission loss≤0.154 dB/km, it is necessary to satisfy $(I_{D2}/I_{\omega 3})_{Pmax}$≤0.48. To obtain transmission loss≤0.152 dB/km, it is necessary to satisfy $(I_{D2}/I_{\omega 3})_{Pmax}$≤0.45. To obtain transmission loss≤0.150 dB/km, it is necessary to satisfy $(I_{D2}/I_{\omega 3})_{Pmax}$≤0.40. Furthermore, to obtain transmission loss≤0.148 dB/km, it is necessary to satisfy $(I_{D2}/I_{\omega 3})_{Pmax}$≤0.40.

Therefore, to realize transmission loss≤0.154 dB/km, $(I_{D2}/I_{\omega 3})_{Pmax}$ is preferably 0.48 or less. If a manufacturing variation is considered, $(I_{D2}/I_{\omega 3})_{Pmax}$ is more preferably 0.45 or less.

Figure 6:
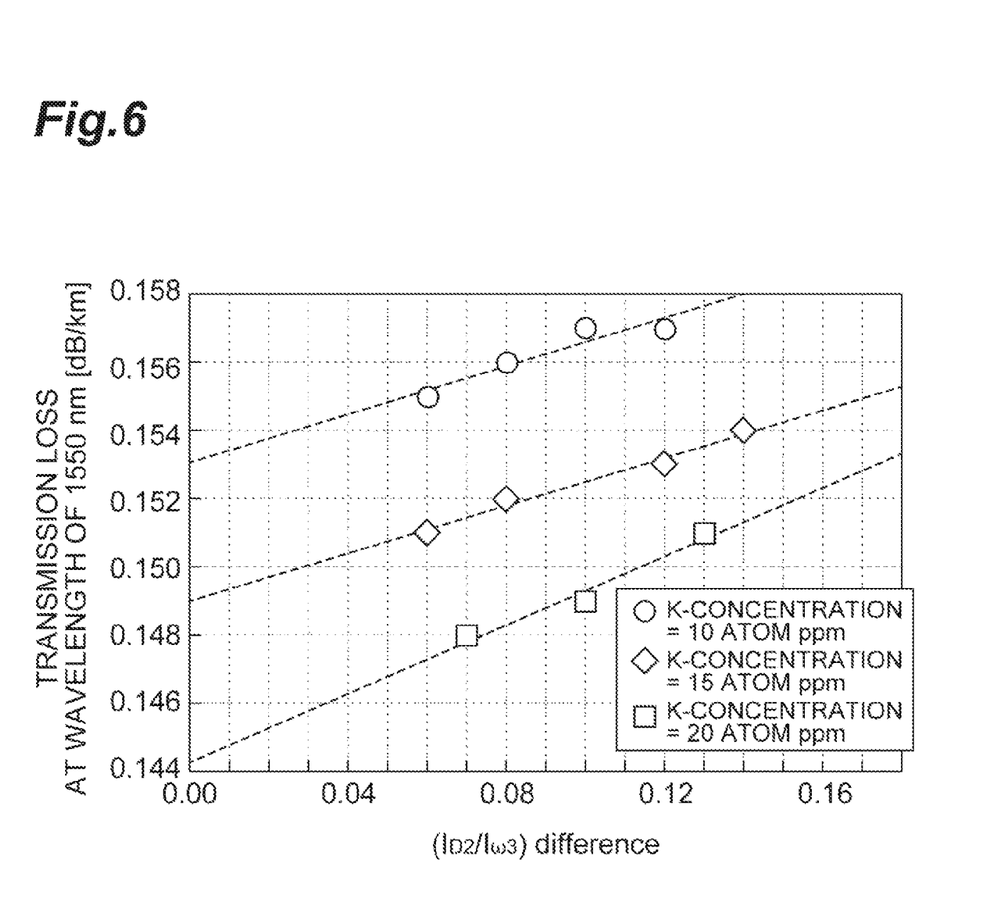
FIG. 6 is a graph illustrating a relation of a $(I_{D2}/I_{\omega 3})_{difference}$ and transmission loss with respect to each of optical fibers of samples 1 to 11.

FIG. 6 is a graph illustrating a relation of $(I_{D2}/I_{\omega 3})_{difference}$ and transmission loss. $(I_{D2}/I_{\omega 3})_{difference}$ is a difference between a value of a ratio $I_{D2}/I_{\omega 3}$ at a position where the field intensity of the guided light at the wavelength of 1550 nm calculated on the basis of the refractive index profile 150 (FIG. 3B) of the optical fiber 100 is maximized and a value of a ratio $I_{D2}/I_{\omega 3}$ on the optical axis AX (center of a cross section of the optical fiber). The transmission loss is a value at the wavelength of 1550 nm. In FIG. 6, $(I_{D2}/I_{\omega 3})_{difference}$ of the samples 1 to 4 in which the mean K-concentration in the core is set to 10 atom ppm are 0.12, 0.10, 0.08, and 0.06, respectively (refer to FIG. 7). $(I_{D2}/I_{\omega 3})_{difference}$ of the samples 5 to 8 in which the mean K-concentration in the core is set to 15 atom ppm are 0.14, 0.12, 0.08, and 0.06, respectively (refer to FIG. 7). $(I_{D2}/I_{\omega 3})_{difference}$ of the samples 9 to 11 in which the mean K-concentration in the core is set to 20 atom ppm are 0.13, 0.10, and 0.07, respectively (refer to FIG. 7).

From FIG. 6, it is known that the transmission loss at the wavelength of 1550 nm is low when $(I_{D2}/I_{\omega 3})_{difference}$ is small, at each K-concentration. Reduction of the transmission loss is assumed as follows. When a radial direction variation of $I_{D2}/I_{\omega 3}$ of the core portion is small, a glass structure change decreases (that is, distortion decreases) and scattering loss of glass is reduced as a result thereof.

Specifically, the following is known from FIG. 6 when a K-concentration is 15 ppm. To obtain transmission loss≤0.154 dB/km, it is necessary to satisfy $(I_{D2}/I_{\omega 3})_{difference}$≤0.14. To obtain transmission loss≤0.152 dB/km, it is necessary to satisfy $(I_{D2}/I_{\omega 3})_{difference}$≤0.08. In addition, to obtain transmission loss≤0.150 dB/km, it is necessary to satisfy $(I_{D2}/I_{\omega 3})_{difference}$≤0.03.

Therefore, to realize transmission loss≤0.154 dB/km, $(I_{D2}/I_{\omega 3})_{difference}$ is preferably 0.14 or less (when K-concentration=15 atom ppm), more preferably 0.03 or less (when K-concentration=10 atom ppm).

Figure 7:
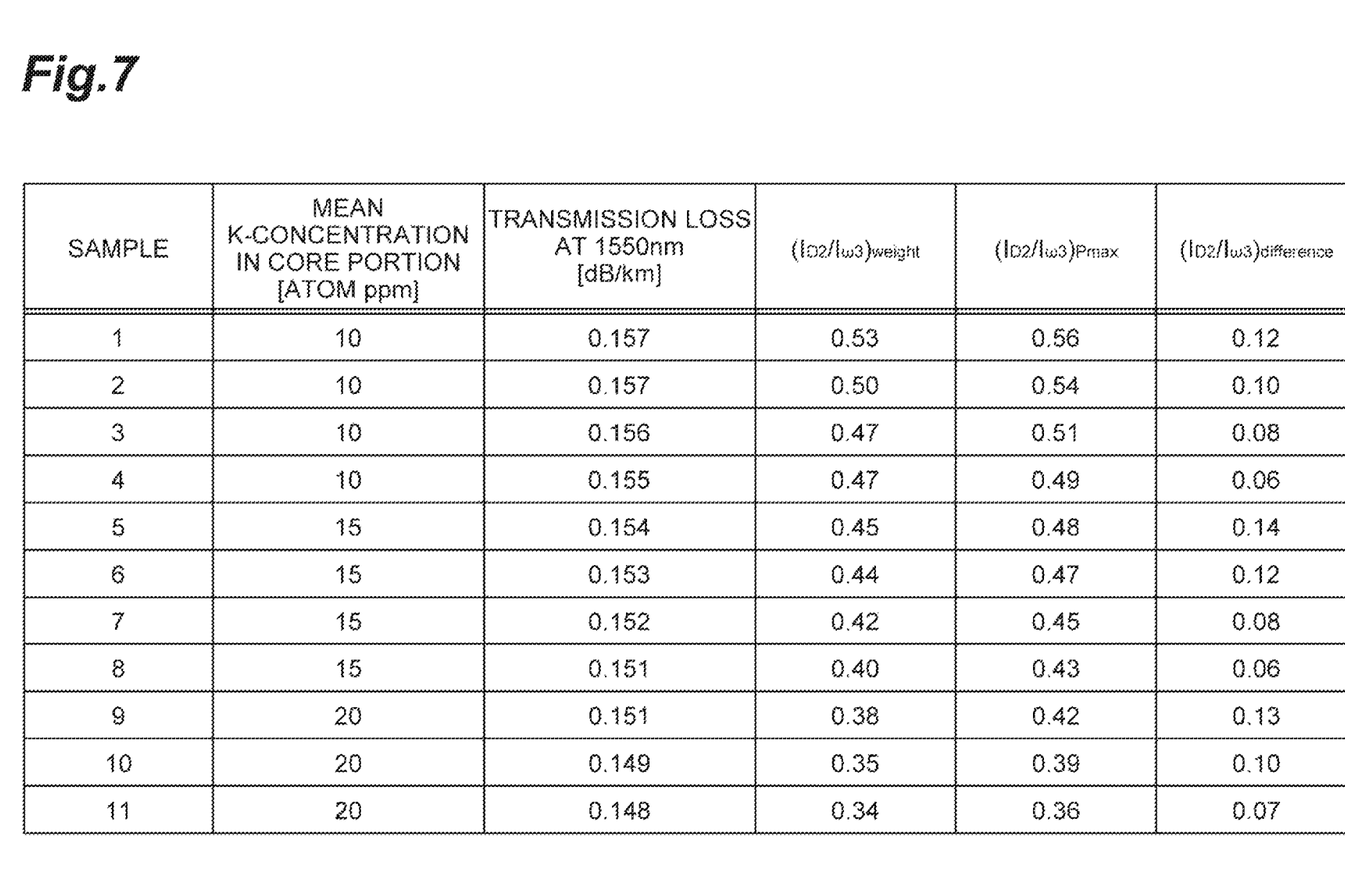
FIG. 7 is a table illustrating specifications of optical fibers of samples 1 to 11 illustrated in FIGS. 4 to 6.

FIG. 7 is a table illustrating specifications of the optical fibers of the samples 1 to 11 illustrated in FIGS. 4 to 6. That is, FIG. 7 illustrates a mean K-concentration of the core 110, transmission loss at the wavelength of 1550 nm, $(I_{D2}/I_{\omega 3})_{weight}$, $(I_{D2}/I_{\omega 3})_{Pmax}$, and $(I_{D2}/I_{\omega 3})_{difference}$, for each of the optical fibers of the samples 1 to 11.

Figure 8:
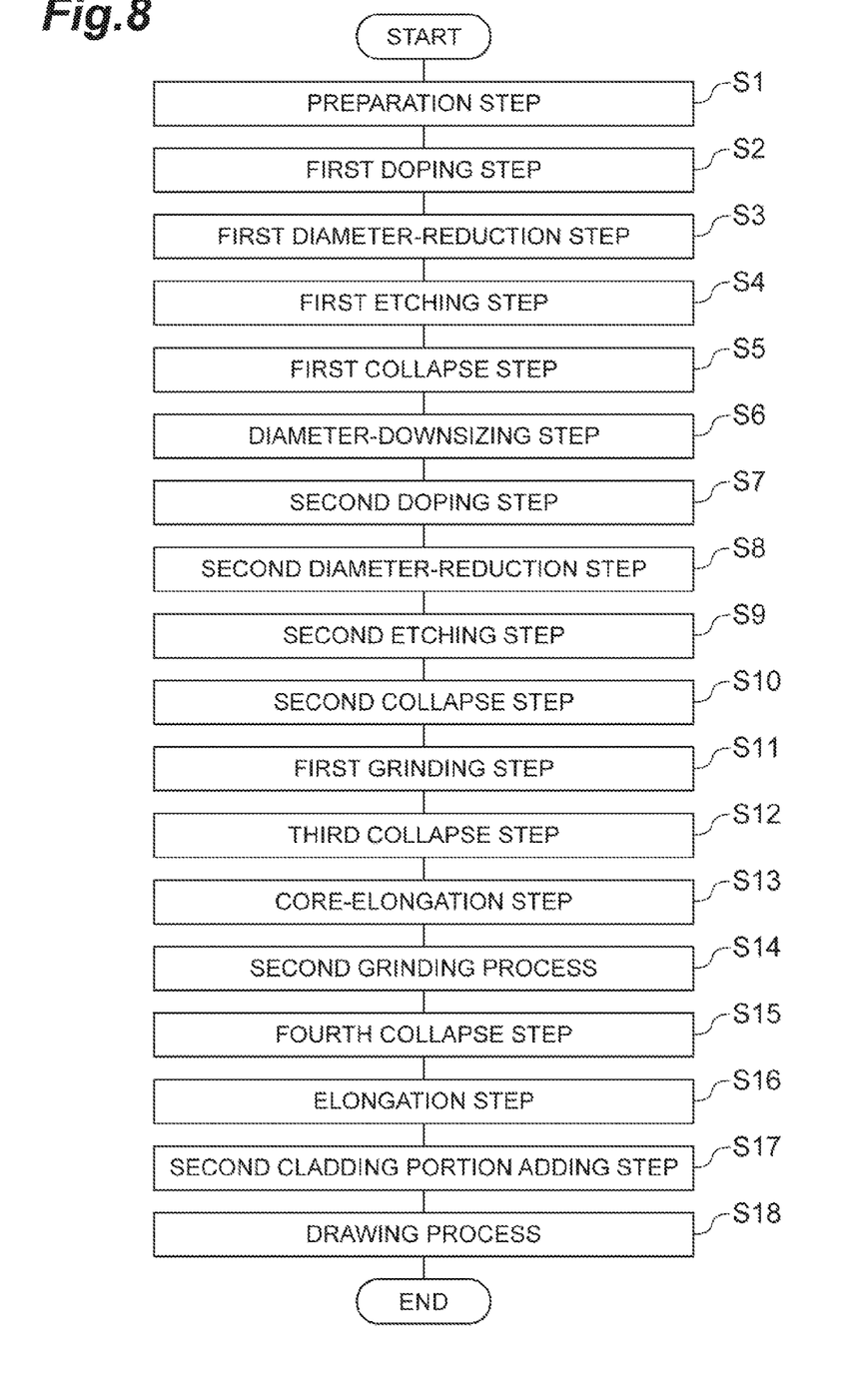
FIG. 8 is a flowchart illustrating an optical fiber manufacturing method.

As an example, a method of manufacturing the optical fiber of the sample 11 will be described hereinafter using FIG. 8. FIG. 8 is a flowchart illustrating an optical fiber manufacturing method. The optical fiber manufacturing method of FIG. 8 can manufacture the optical fiber of the sample 11 by executing a preparation step S1, a first doping step S2, a first diameter-reduction step S3, a first etching step S4, a first collapse step S5, a diameter-downsizing step S6, a second doping step S7, a second diameter-reduction step S8, a second etching step S9, a second collapse step S10, a first grinding step S11, a third collapse step S12, a core-elongation step S13, a second grinding step S14, a fourth collapse step S15, an elongation step S16, a second cladding portion adding step S17, and a drawing step S18 sequentially.

In the preparation step S1, a first glass pipe is prepared. The first glass pipe is comprised of silica-based glass. In the first glass pipe, a chlorine (Cl) concentration is 150 atom ppm, a fluorine (F) concentration is 6,000 atom ppm, and other dopant and impurity concentrations are 10 mol ppm or less. Also, an outer diameter of the first glass pipe is 35 mm and an inner diameter thereof is 20 mm.

In the first doping step S2, an alkali metal element is doped to an inner surface of the first glass pipe. Specifically, potassium bromide (KBr) is used as an alkali metal raw material, the potassium bromide is heated at a temperature of 850° C. by a heat source, and KBr vapor is generated. The KBr vapor is introduced into the first glass pipe together with oxygen of 1 slm (1 liter/minute in a standard state) as carrier gas. In the meantime, the first glass pipe is heated by an oxygen-hydrogen burner from the outside, such that a temperature of a surface of the first glass pipe becomes 2150° C. At this time, the oxygen-hydrogen burner is traversed at a speed of 40 m/min along a longitudinal direction of the first glass pipe (a total of 15 turns), to cause a potassium element (K) to diffuse into an inner surface of the first glass pipe.

In the first diameter-reduction step S3, a diameter of the first glass pipe is reduced by heating. Specifically, while oxygen (0.5 slm) is made to flow into the first glass pipe to which K is doped, the first glass pipe is heated by the oxygen-hydrogen burner, such that the temperature of the external surface of the first glass pipe becomes 2250° C. The first glass pipe is heated by traversing the oxygen-hydrogen burner multiple times and the diameter of the first glass pipe is reduced until an inner diameter of the first glass pipe becomes 5 mm.

In the first etching step S4, an inner surface of the first glass pipe is etched to remove a transition metal element such as Ni and Fe or an OH group doped simultaneously when the alkali metal element is doped in the first doping step S2. Specifically, while mixed gas of $SF_6$ (0.2 slm) and oxygen (0.5 slm) is introduced into the first glass pipe to which K is doped, the first glass pipe is heated by the oxygen-hydrogen burner, so that vapor phase etching for the inner surface of the first glass pipe is performed.

In the first collapse step S5, a first middle rod (glass rod) is manufactured by solidifying the first glass pipe. Specifically, the first glass pipe is heated by the oxygen-hydrogen burner to cause the surface temperature to become 2150° C., so that the first glass pipe is solidified. In the meantime, the first glass pipe after the first etching step S4 is decompressed into an absolute pressure of 97 kPa or less and oxygen (2 slm) is introduced into the first glass pipe. As a result, the first middle rod to which potassium (K) is doped and which has a diameter of 25 mm is manufactured.

In the diameter-downsizing step S6, an outer peripheral portion of the first middle rod manufactured by the first collapse step S5 is removed, so that a first core rod (first glass rod) with a diameter reduced is manufactured. Specifically, a center portion (with a diameter of 5 mm) of the first middle rod extracted by digging out the first middle rod manufactured by the first collapse step S5 along a longitudinal direction is used as the first core rod. An outer peripheral portion of the first middle rod manufactured by the first collapse step S5 is ground along the longitudinal direction of the first middle rod and the remaining center portion of the first middle rod is used as the first core rod. Here, a potassium concentration (K-concentration) of a surface layer portion of the manufactured first core rod is 200 atom ppm.

In the second doping step S7, K is doped to an inner surface of a second glass pipe. The second glass pipe is comprised of silica-based glass, similar to the first glass pipe. Doping of K to the second glass pipe is performed in the same way as the first doping step S2.

In the second diameter-reduction step S8, the second glass pipe after the second doping step S7 is heated, so that a diameter of the second glass pipe is reduced. Specifically, the second glass pipe is heated by the oxygen-hydrogen burner such that an external surface of the second glass pipe becomes 2250° C. In the meantime, oxygen (0.5 slm) is introduced into the second glass pipe to which K is doped. While the oxygen-hydrogen burner is traversed six times, the second glass pipe is heated, so that the diameter of the second glass pipe is reduced. An inner diameter of the second glass pipe after the diameter-reduction is about 0.1 mm to 1 mm larger than an outer diameter of the first glass rod manufactured by the diameter-reduction step S6.

In the second etching step S9, an inner surface of the second glass pipe after the second diameter-reduction step S8 is etched to remove a transition metal element such as Ni and Fe or an OH group doped simultaneously when the alkali metal element is doped in the second doping step S7. Specifically, the second glass pipe is heated by the oxygen-hydrogen burner, so that vapor phase etching for the inner surface of the second glass pipe is performed. In the meantime, mixed gas of $SF_6$ (0.2 slm) and oxygen (0.5 slm) is introduced into the second glass pipe to which K is doped.

In the second collapse step S10, a second middle rod (glass rod) is manufactured by a rod-in collapse method. That is, in a state in which the first core rod manufactured by the diameter-downsizing step S6 is inserted into the second glass pipe after the second etching step S9, the first core rod and the second glass pipe are integrated by heating. Specifically, a surface temperature of the second glass pipe is caused to become 2150° C. by the oxygen-hydrogen burner, so that the rod-in collapse is performed. In the meantime, similarly to the first collapse step S5, the second glass pipe is decompressed into an absolute pressure of 97 kPa or less and oxygen (2 slm) is introduced into the second glass pipe.

In the first grinding step S11, an outer peripheral portion of the second middle rod manufactured by the second collapse step S10 is ground, so that a second core rod is manufactured. Here, the manufactured second core rod has a diameter of 16 mm and K is not doped to the second core rod as a whole. That is, K is not doped to an outer peripheral region of the second core rod. The second core rod has a first core portion (portion becoming the K-doped region 111a after drawing) that has a chlorine concentration (Cl-concentration) of 150 atom ppm, a fluorine concentration of 6,000 atom ppm, and includes K and a second core portion (portion becoming the K-undoped region 111b after drawing) that is a portion surrounding the first core portion and has a chlorine concentration of 150 atom ppm, a fluorine concentration (F-concentration) of 6,000 atom ppm, and has a K-concentration of 10 atom ppm or less. The second core portion does not include K substantially.

In the third collapse step S12, a third core portion (portion becoming the outer core 112 after drawing) is added to outer periphery of the second core rod. That is, in this step, a third glass pipe having a chlorine concentration of 12,000 atom ppm, not including a dopant other than chlorine substantially, and comprised of silica-based glass is prepared and a third middle rod is manufactured by adding the third core portion to the outer periphery of the second core rod by the rod-in collapse method. In the rod-in collapse method, in a state in which the second core rod is inserted into the third glass pipe, the third glass pipe and the second core rod are integrated by heating.

In the core-elongation step S13, to set an outer diameter of the third middle rod to 27 mm, the third middle rod manufactured by the third collapse step S12 is extended while being heated.

In the second grinding step S14, to manufacture a third core rod (core preform) having a diameter of 20 mm, an outer peripheral portion of the third middle rod elongated by the core-elongation step S13 is ground. The core preform (third core rod) is a portion that finally becomes the core portion 11 of the optical fiber preform 10 illustrated in FIG. 2 and becomes the core 110 of the optical fiber 100 after drawing.

The core preform has a first core portion that has a chlorine concentration of 150 atom ppm, a fluorine concentration of 6,000 atom ppm, and includes K, a second core portion that is a portion surrounding the first core portion and has a chlorine concentration of 150 atom ppm, a fluorine concentration of 6,000 atom ppm, and has a K-concentration of 10 atom ppm or less, and a third core portion that is a portion surrounding the second core portion and has a chlorine concentration of 12,000 atom ppm and has a K-concentration of 10 atom ppm or less. The second core portion and the third core portion do not include a potassium element substantially. A ratio of the diameter of the first core portion in the core preform and the diameter (20 mm) of the core rod is 5 times.

In the fourth collapse step S15, a first cladding portion is added to outer periphery of the third core portion. In this step, a fourth glass pipe to which fluorine is doped and which is comprised of silica-based glass is prepared and the first cladding portion is added to the outer periphery of the third core portion by the rod-in collapse method. In the rod-in collapse method, in a state in which the core preform is inserted into the fourth glass pipe, the fourth glass pipe and the core preform are integrated by heating. A relative refractive index difference A of the core portion and the first cladding portion is a maximum of about 0.34%.

In the elongation step S16, a fourth middle rod (glass rod) in which the core preform and the fourth glass pipe are integrated in the fourth collapse step S15 is elongated. Specifically, a diameter of the fourth middle rod is adjusted such that a diameter of the core 110 of the optical fiber 100 to be manufactured by the drawing step S18 becomes a desired value (for example, a diameter of 125 μm).

In the second cladding portion adding step S17, a second cladding portion is added to outer periphery of the first cladding portion, so that the optical fiber preform 10 (FIG. 2) is manufactured. That is, in this step, the second cladding portion to which fluorine is doped and which is comprised of silica-based glass is synthesized to outer periphery of the fourth middle rod after the elongation step S16, by a method such as an OVD method, a VAD method, and a rod-in collapse method. In the optical fiber preform 10 manufactured for the optical fiber of the sample 11, a mean K-concentration of the core portion 11 is 20 atom ppm.

in the drawing step S18, the optical fiber preform 10 manufactured as described above is drawn, so that the optical fiber 100 (sample 11) is manufactured. Transmission loss at the wavelength of 1550 nm in the optical fiber 100 is 0.148 dB/km.

Figure 9:
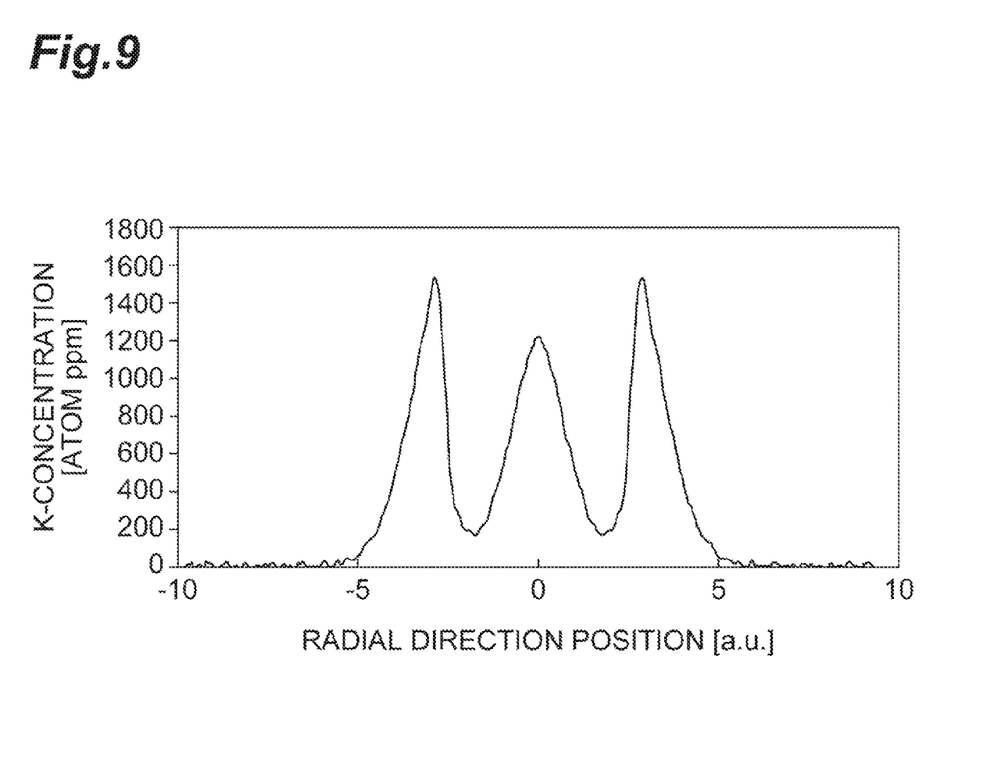
FIG. 9 is a graph illustrating an example of a potassium concentration distribution of a second middle rod (glass rod) manufactured by a second collapse step S10.

FIG. 9 is a graph illustrating an example of a K-concentration distribution of the second middle rod manufactured by the second collapse step S10. As illustrated in FIG. 9, in a rod cross section, a K-concentration has not only a concentration peak at a center of a cross section of the manufactured optical fiber, that is, on the optical axis AX but also a concentration peak at a certain position of a radial direction.

The optical fiber of the sample 11 is manufactured by the method described above. Also, the optical fibers of the samples 3, 4, 7, and 8 are manufactured by a manufacturing method having the first doping step S2 and the second doping step S7. However, in the samples, the temperature of an electric furnace and the number of times of traversing in each of the first doping step S2 and the second doping step S7 are changed to have characteristics illustrated in FIG. 7. The optical fiber of the sample 2 is manufactured by the same step as the manufacturing method of the sample 11 from the second doping step S7, using the glass rod (first core rod) in which the center rod does not include K. As a result, the optical fiber of the sample 2 has a K-concentration distribution in which K is doped in a ring shape in a part (annular region surrounding a core center region including the optical axis AX in the K-doped region 111a, at a predetermined distance) of the core 110. The optical fibers of the samples 6 and 10 are manufactured by the same manufacturing method as the sample 2.

The samples 1, 5, and 9 are manufactured by the same step as the manufacturing method (FIG. 8) of the optical fiber of the sample 11, except that the second doping step S7 is not executed. Therefore, each of the samples 1, 5, and 9 is an optical fiber in which K is doped to only a core center region including the optical axis AX.

REFERENCE SIGNS LIST

10: optical fiber preform, 11: core portion (core preform), 12: cladding portion, 100: optical fiber, 110: core, 111a: K-doped region (inner core), 111b: K-undoped region (inner core), 112: outer core, 120: cladding, 121: inner cladding, 122: outer cladding, 150: refractive index profile, 160: K-concentration distribution

The invention claimed is:

1. An optical fiber mainly comprised of silica-based glass, comprising:
   a core extending along an optical axis and including an alkali metal element; and
   a cladding surrounding the core and having a refractive index lower than that of the core,
   wherein, where an intensity of Raman scattering light ω3 by a Si—O stretching vibration in a Raman scattering spectrum is $I_{\omega 3}$ and an intensity of Raman scattering light D2 by a silica three-membered ring structure is $I_{D2}$, a mean concentration of the alkali metal element in the core or a shape of a concentration distribution of the alkali metal element in the core is adjusted such that 0.48 or less is obtained as a weighted value of a distribution of a ratio $I_{D2}/I_{\omega 3}$ along the radial direction of the optical fiber, the weighted value being obtained by weighting the distribution of the ratio $I_{D2}/I_{\omega 3}$ with a distribution of field intensity along a radial direction of guided light at a wavelength of 1550 nm, calculated from a refractive index profile along the radial direction of the optical fiber, in a region including the optical axis as a center and having a diameter of 20 μm in a cross section of the optical fiber orthogonal to the optical axis.

2. The optical fiber according to claim 1, wherein the alkali metal element includes potassium.

3. The optical fiber according to claim 1, wherein the concentration distribution of the alkali metal element, in the cross section of the optical fiber orthogonal to the optical axis, has a shape in which a first concentration peak is located in an annular region surrounding the optical axis in a state in which the annular region is separated by a predetermined distance from the optical axis.

4. The optical fiber according to claim 3, wherein the concentration distribution of the alkali metal element, in the cross section of the optical fiber orthogonal to the optical axis, has a shape in which a second concentration peak, having a maximum concentration lower than a maximum concentration of the first concentration peak, is located in a region surrounded by the annular region.

5. The optical fiber according to claim 1, wherein the concentration distribution of the alkali metal element, in the cross section of the optical fiber orthogonal to the optical axis, has a shape in which there are a plurality of concentration peaks separated from each other along the radial direction of the optical fiber, and
a maximum concentration of one concentration peak close to the optical axis in two adjacent concentration peaks included in the plurality of concentration peaks is lower than a maximum concentration of the other concentration peak in the two adjacent concentration peaks.

6. An optical fiber mainly comprised of silica-based glass, comprising:
   a core extending along an optical axis and including an alkali metal element; and
   a cladding surrounding the core and having a refractive index lower than that of the core,
   wherein, where an intensity of Raman scattering light ω3 by a Si—O stretching vibration in a Raman scattering spectrum is $I_{\omega 3}$ and an intensity of Raman scattering light D2 by a silica three-membered ring structure is $I_{D2}$, a mean concentration of the alkali metal element in the core or a shape of a concentration distribution of the alkali metal element in the core is adjusted such that 0.50 or less is obtained as a ratio $I_{D2}/I_{\omega 3}$ at a position where a field intensity of guided light at a wavelength of 1550 nm calculated from a refractive index profile along a radial direction of the optical fiber is maximized, in a cross section of the optical fiber orthogonal to the optical axis.

7. The optical fiber according to claim 6, wherein the alkali metal element includes potassium.

8. The optical fiber according to claim 6, wherein the concentration distribution of the alkali metal element, in the cross section of the optical fiber orthogonal to the optical axis, has a shape in which a first concentration peak is located in an annular region surrounding the optical axis in a state in which the annular region is separated by a predetermined distance from the optical axis.

9. The optical fiber according to claim 8, wherein the concentration distribution of the alkali metal element, in the cross section of the optical fiber orthogonal to the optical axis, has a shape in which a second concentration peak, having a maximum concentration lower than a maximum concentration of the first concentration peak, is located in a region surrounded by the annular region.

10. The optical fiber according to claim 6, wherein the concentration distribution of the alkali metal element, in the cross section of the optical fiber orthogonal to the optical axis, has a shape in which there are a plurality of concentration peaks separated from each other along the radial direction of the optical fiber, and a maximum concentration of one concentration peak close to the optical axis in two adjacent concentration peaks included in the plurality of concentration peaks is lower than a maximum concentration of the other concentration peak in the two adjacent concentration peaks.

11. An optical fiber mainly comprised of silica-based glass, comprising:

a core extending along an optical axis and including an alkali metal element; and a cladding surrounding the core and having a refractive index lower than that of the core, wherein, where an intensity of Raman scattering light ω3 by a Si—O stretching vibration in a Raman scattering spectrum is $I_{\omega 3}$ and an intensity of Raman scattering light D2 by a silica three-membered ring structure is $I_{D2}$, a mean concentration of the alkali metal element in the core or a shape of a concentration distribution of the alkali metal element in the core is adjusted such that 0.15 or less is obtained as a difference between a value of a ratio $I_{D2}/I_{\omega 3}$ at a position where a field intensity of guided light at a wavelength of 1550 nm calculated from a refractive index profile along a radial direction of the optical fiber is maximized and a value of a ratio $I_{D2}/I_{\omega 3}$ on the optical axis, in a cross section of the optical fiber orthogonal to the optical axis.

12. The optical fiber according to claim 11, wherein the alkali metal element includes potassium.

13. The optical fiber according to claim 11, wherein the concentration distribution of the alkali metal element, in the cross section of the optical fiber orthogonal to the optical axis, has a shape in which a first concentration peak is located in an annular region surrounding the optical axis in a state in which the annular region is separated by a predetermined distance from the optical axis.

14. The optical fiber according to claim 13, wherein the concentration distribution of the alkali metal element, in the cross section of the optical fiber orthogonal to the optical axis, has a shape in which a second concentration peak, having a maximum concentration lower than a maximum concentration of the first concentration peak, is located in a region surrounded by the annular region.

15. The optical fiber according to claim 11, wherein the concentration distribution of the alkali metal element, in the cross section of the optical fiber orthogonal to the optical axis, has a shape in which there are a plurality of concentration peaks separated from each other along the radial direction of the optical fiber, and a maximum concentration of one concentration peak close to the optical axis in two adjacent concentration peaks included in the plurality of concentration peaks is lower than a maximum concentration of the other concentration peak in the two adjacent concentration peaks.

* * * * *